Oct. 23, 1951  G. V. RYLSKY  2,572,766
PENDULUM DEVICE
Filed Jan. 25, 1945  2 SHEETS—SHEET 1

INVENTOR.
Gregory V. Rylsky.
BY
 Kalman.
ATTORNEY

Oct. 23, 1951 G. V. RYLSKY 2,572,766
PENDULUM DEVICE
Filed Jan. 25, 1945 2 SHEETS—SHEET 2
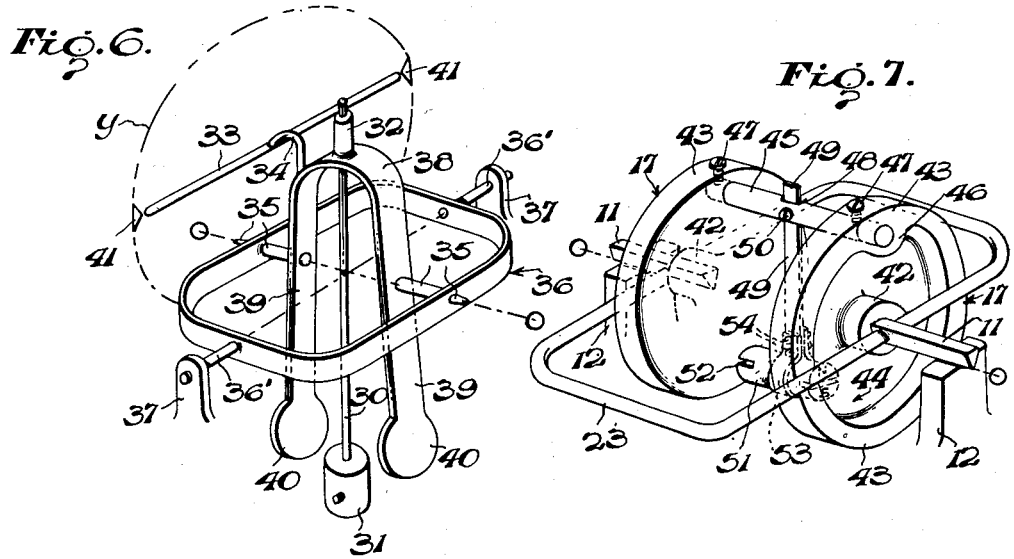
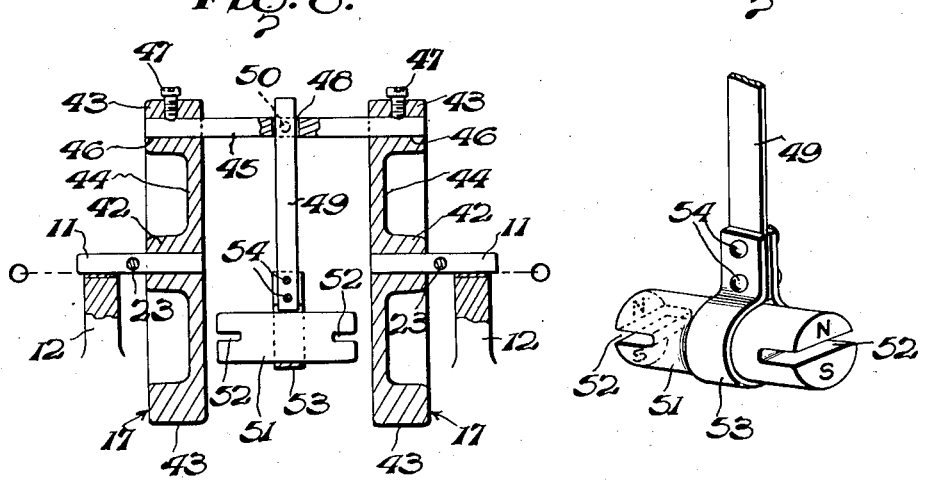
Inventor
Gregory V. Rylsky.
By
Attorney Patented Oct. 23, 1951

2,572,766

UNITED STATES PATENT OFFICE 2,572,766

PENDULUM DEVICE

Gregory V. Rylsky, Ridgefield Park, N. J., assignor to Bendix Aviation Corporation, Teterboro, N. J., a corporation of Delaware Application January 25, 1945, Serial No. 574,576

10 Claims. (Cl. 33—220)

1

The present invention relates generally to artificial horizon indicators or like devices and more particularly to novel improvements in pendulous means for such devices.

Heretofore pendulous indicating devices have been subject to too rapid response to undesired forces, such as horizontal acceleration or the like and one object of the present invention is to provide an improved pendulous responsive mechanism, which compensates for accidental horizontal acceleration impulses, that result in premature unbalancing of such indicating devices.

A further object is to provide novel means, whereby a balance member will maintain a constant angular position with respect to the horizon, independently of accidental accelerations in a horizontal direction.

A further object of the invention is to provide in an instrument of the horizon indicator type a novel mounting for a pendulous member, whereby normal accidental horizontal accelerations imparted to the pendulous member have small effect on the mounting with which said pendulous member is associated.

Another object of the invention is to provide a pendulum which is not appreciably affected by unsustained acceleration in a horizontal direction or directions.

A still further object of the invention is to provide means for establishing an artificial horizon or horizontal plane including a pendulous member horizontally fulcrumed on a single axis or a plurality of axes intersecting one another in the same horizontal plane, and providing supporting means for the pendulous member whereby when the device remains still or at rest, or upon movement thereof horizontally at a constant speed, the direction of the force of the pendulum weight passes through a horizontal axis, and the moment of this force about this axis acting on tthe supporting means for the pendulous member tending to disturb its vertical position is practically nil or equal to zero so that a pointer in fixed relation to the support will maintain its horizontal position; further, that when horizontal accelerations occur, the pendulum weight will move relative to the pendulous member against an elastic support in order that said moment of the force of the pendulum weight tending to disturb the vertical position of the pendulous member is considerably reduced, or even momentarily reversed; still further that the degree of stiffness and effective length or leverage of the elastic support

2 or pendulum arm varies in action and produces a variable leverage and governs the value of that moment and, consequently, the speed of response to the resultant force of gravity plus acceleration.

The above and other objects and advantages of the invention will appear more fully hereinafter from a consideration of the detailed description which follows, taken together with the accompanying drawings wherein four embodiments of the invention are illustrated. It is to be expressly understood, however, that the drawings are for the purpose of illustration only and are not intended to define the limits of the invention, reference being had for this purpose to the appended claims.

Figure 6 is a similar view of a further modification.

Figure 7 is a perspective view showing another form of the invention somewhat corresponding to Figure 1 but with a different means for checking or damping the movement of the pendulous member tending to disturb its vertical position.

Figure 8 is a vertical section of the device shown in Figure 7, and

Figure 9 is a fragmentary perspective view of the pendulous member.

Figure 1:
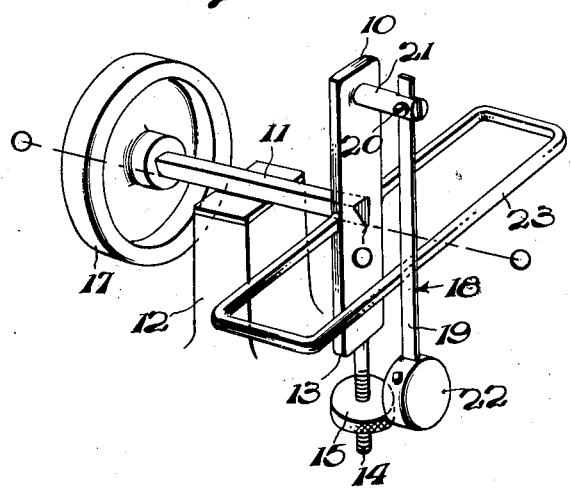
Figure 1 is a perspective view of one form of the device.

The embodiment of the present invention for establishing an artificial horizon or horizontal plane is illustrated in the form of a support member for an indicator even though not limited thereto, since the latter may be omitted, and having a pendulum which is not appreciably affected by accelerations in a horizontal direction and may embody a scale device or pointer designed to keep a certain member in an approximately constant angular position with respect to the horizon, independently of accidental accelerations in a horizontal direction to which the device may be subjected. In its specific form as illustrated, it embodies substantially two elements or parts consisting of a support or frame represented in the form of a vertical lever or levers fulcrumed on a horizontal axis or axes normal to each other in the same horizontal plane and balanced so as to maintain such position and designed to support one or more pendulums suspended by a resilient member or arm passing through the fulcrum or pivot axis of the supporting frame or lever so that when the device is subjected to the action of accelerations in any direction, such as movement due to accidental horizontal acceleration impulses, the supporting frame or lever being balanced, is not affected thereby but will remain in its true balanced position so that a pointer mounted thereon will always indicate within practical tolerance, the true horizon. It consists of a supporting member or frame 10 shown in the form of a vertical bar or lever in Figures 1, 2 and 3 balanced by being fixed or mounted on one end of a horizontal fulcrum about the axis O—O of the pivot or prism 11 constituting the fulcrum at the lower tapered edge thereof. This fulcrum or prism has its knife edge mounted or fulcrumed in the usual or any desired way as common in connection with weighing scales or the like and rests on one or more supporting surfaces or bearings represented in the form of an agate cuspin or cushion 12 adapted to be mounted upon a suitable base (not shown) for the instrument which supports and is adapted to be enclosed in a suitable case or cover (not shown) which may be of glass, plastic or other transparency or provided with a transparent window through which an indicator or pointer may be observed. The supporting frame of considerable moment of inertia about axis O—O, such as represented by the bar or lever 10 is balanced about the axis O—O and as described, is supported like the lever of a weight scale by means of a prism or prisms embodied in it and resting on the bearing as described, but the position of this frame or lever in the fully assembled device is vertical as shown. To provide for the accurate balance of the supporting frame or lever so as to set it in a true vertical position, the lower end 13 thereof may be provided with a threaded bore to take or formed with a reduced portion or a threaded stem 14 on which a counterweight in the form of a knurled nut 15 may be threaded for adjustment or otherwise suitably mounted to put the lever in balance on the axis O—O. A counterweight and inertia disc 17 may also be mounted on one end of the fulcrum 11 to counterbalance the weight of the frame or lever 10 and also assist in stabilizing the balanced position thereof as vertically arranged.

As so supported and balanced, the lever itself or its vertical position is not appreciably affected or disturbed by the action of acceleration in a given direction and it is therefore adapted to support a pendulous means in the form of a resilient or elastic pendulum or arm 18 shown in the form of a flat spring arm 19 having its upper end portion rigidly clamped or fastened above the axis O—O as at 20 to the frame member or lever 10 through the medium of an outstanding arm 21 which may be slotted to receive a clamping or connecting screw for this purpose, so as to suspend the spring in spaced relation to the frame in a true vertical position extending through or intersecting the horizontal pivot axis O—O. At its lower end, the pendulum is provided with the weight 22 so that the center of mass of the pendulum is below axis O—O and the weight is chosen in accordance with elastic characteristics of arm 19. The pendulum is thus suspended from a fixed point of a supporting frame or member which although fulcrumed horizontally is kept in a constant angular position with respect to the horizon or vertical, and does not move under or independently of the action of accelerations, especially in a horizontal direction, to which the device may be subjected, although the pendulum is free to swing to and fro under the combined action of gravity and momentum.

Figure 2:
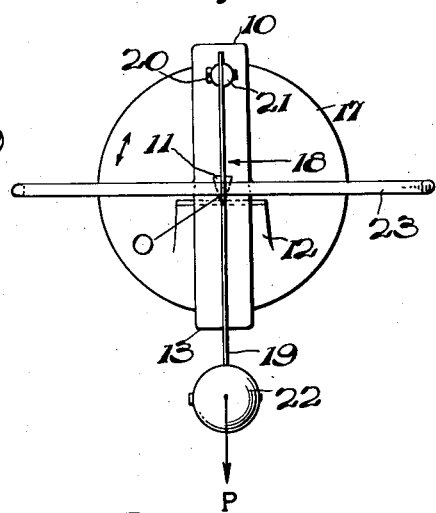
Figure 2 is a front elevation showing the device in a position of rest or while moving with a constant speed.

In Figure 2 of the drawings, a partly schematic illustration is shown in which the point O on the axis O—O is a projection of a line which passes through the center of gravity of the member 10 and coincides with the knife edge of the prism 11. It will be noted that in this position, when the device is at rest or remains still, or while it is moving with a constant speed, the direction of force of the weight 22 passes through the point O which the suspended pendulum or spring thereof intersects perpendicular or normal to the pivot axis O—O, on which the device is balanced, and the moment of this force about the point O acting on the member 10 is equal to zero. Even though the cuspins or cushions 12 may be tilted around the knife edge of a fulcrum O—O of the prism 11, still the member 10 under the action of the resilient or elastic pendulum 18 will remain in the same angular or vertical position unaffected by unsustained acceleration in horizontal directions, or accidental horizontal acceleration impulses that would ordinarily result in premature unbalancing such indicating devices. The frame may be provided with a rectilinear pointer 23 of any suitable character to indicate or establish an artificial horizon or horizontal plane which is constantly maintained in such position by being normal to the member 10 although this may vary slightly depending on the degree of acceleration.

Figure 3:
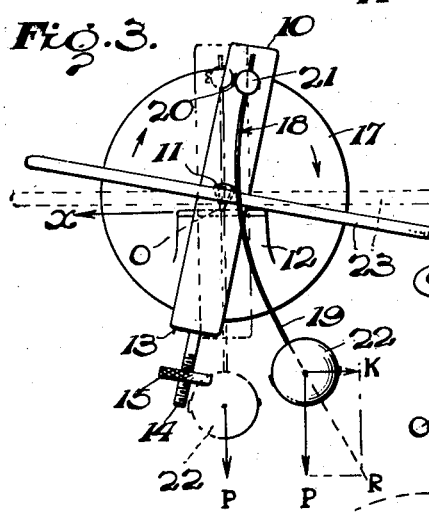
Figure 3 is a view similar to Figure 2 showing the action of the pendulum under vibrations or accidental horizontal acceleration impulses.

Figure 3 shows the device subjected to a constant acceleration in a horizontal direction to the left as indicated by the arrow $x$, such accelerations being for instance, as those to which an aircraft may be subjected in flight, or any accidental movement tending to unbalance the device. Under the action of this acceleration, the weight 22 will shift to the right by reason of the elastic action of the spring 19 until the elastic reactance of the spring will stop it to maintain the balance of forces acting on the spring. However, the member 10 will remain in a vertical position of true balance so as not to affect the indication of the true horizon. If the characteristics of the spring 19, the weight of the pendulum 22 and the position of the clamp 20 and supporting arm 21 on the member 10 are properly chosen, which can be easily calculated, then the sum of the moments of forces; P (weight) and R (reaction of the clamped end of the spring 19) with respect to the point O, will be practically equal to zero, and thus, the member 10 will remain in approximately the same position as it was before acceleration took place due to the pendulosity, or more slightly to the right of the axis O.

Figure 4:
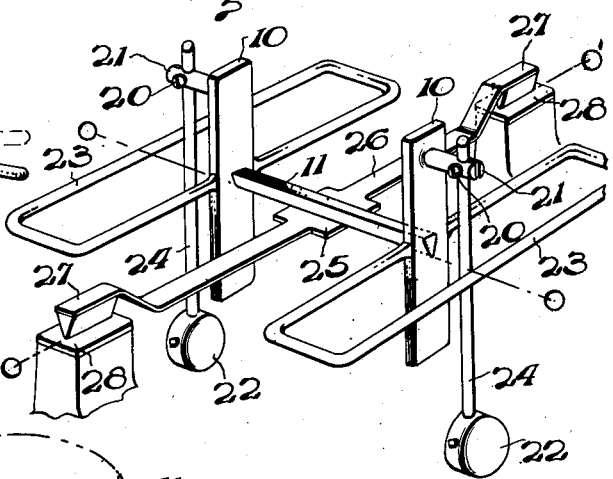
Figure 4 is a perspective view showing another form of the invention employing two pendulums.

In Figure 4 of the drawings a modified form is shown in which a plurality, such as two parallel supporting members or levers 10, in vertical and horizontal alignment are used and balanced on the corresponding axis O—O as by means of the fulcrum or prism bar 11 on each end of which the levers are fixed. One or both of the members or levers 10 are provided with a pointer 23 as previously described and with correspondingly supported pendulums except that the same may be flat as before described or made of round spring wire 24. The prism 11 rests upon a bearing or agate cushion in the form of a plate 25 supported in a horizontal position normal to the horizontal pivot axis O—O and the prism 11. The bar 26 which in the form shown constitutes the depressed intermediate portion of a fulcrum has prisms 27 at the ends resting upon agate cushions or the like 28 suitably supported on the base of the case (not shown) as heretofore described in connection with Figures 1 to 3 inclusive. This disposes the common pivot axis of the prisms 27 in the same horizontal plane with the horizontal pivot axis O—O of the prism 11 and in such a manner as to intersect the same at right angles. In this manner, the pendulum is not affected by acceleration in horizontal directions in either of the planes. It should also be noted that the supporting frame or member 10 can be made in the form of a flywheel or weighted member to assist in absorbing small undesirable impulses which can appear due to acceleration in this way, the device will always indicate the approximate horizon.

Figure 5:
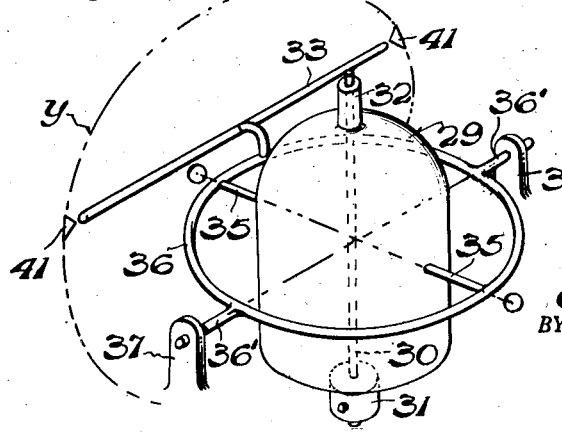
Figure 5 is a similar view of a modified form of the device.

In Figure 5 of the drawings, the device is made in the form of a suspended bell 29 having a depending axial round spring wire pendulum 30 with a weight 31 at its lower end, said pendulum being suspended at the sleeve or neck 32 at the apex of the bell. This bell carries a pointer 33 in a true horizontal position on the end of a curved arm 34 spaced from the bell constituting a balanced support or frame. This support or bell is balanced on a horizontal fulcrum or pivot axis formed by aligned arms 35 projecting outwardly at diametrically opposite points on the bell support 29 corresponding to the fulcrum 11.

The pivots 35 have bearing in a circular horizontal frame or ring 36 concentrically spaced around the ball 29 and horizontally fulcrumed at right angles to the fulcrum formed by the pivots 35 by means of diametrically opposite outwardly projecting horizontal pivot arms 36' on the ring 36 at right angles to the fulcrum formed by the pivots 35 and in the same horizontal plane therewith. The fulcrum formed by pivots 36' corresponds to the fulcrum formed by the prisms 27 in Figure 4 of the drawings and arranged corresponding in the same horizontal plane intersecting each other at right angles. The fulcrum formed by the pivot axes 36 as thus arranged normal to the fulcrum or pivot axis 35, is supported in bearings 37 to give the same results as ascribed to the structures previously referred to.

In Figure 6 of the drawings another form of the invention is shown illustrating a horizon indicating instrument with two pendulums in addition to the forms showing one pendulum. This structure is the same as that shown in Figure 5 except that in lieu of the support bell 29, an inverted substantially U-shaped member 38 is employed correspondingly supporting the pendulum 30 of round spring wire and similarly supported in a ring 36 with the pivot axes normal to each other and in the same horizontal plane intersecting at the center, which is at a point intermediate the ends of both fulcrums or pivot axes, so that the supporting member or frame is balanced in a true vertical position. The lower ends of the depending arms 39 of the member 38 may be weighted as indicated at 40 to assist in the balance and pendulum effect of the pendulous member. An arm and pointer corresponding to the parts 33 and 34 are also provided on the member 38 and the pointer being rectilinear, indicates a horizontal plane to be established representing the horizon when positioned between two stationary calibrations or marks 41 on a dial in the casing and a weight or inertia member Y is fixed or fastened to the fulcrum or pivot axis 35, may be employed as indicated in dotted lines in Figures 5 and 6 of the drawings.

There is thus provided a novel form of pendulum which is not appreciably affected by accelerations in horizontal directions, which constitutes an artificial horizon indicator, and which will partially overcome the difficulties heretofore experienced by devices which are affected by undesirable forces, such as horizontal acceleration accidental or otherwise, or the like, and one which is provided with improved pendulous responsive mechanism which compensates for accidental horizontal acceleration impulses that ordinarily result in premature unbalancing of such indicating devices. The balanced member or supporting frame will maintain an approximately constant angular position with respect to the horizon independently of such accelerations in a horizontal direction so as to give a true reading or indication of the horizon. This is due to the fact that the spring suspension of the pendulum in a vertical line from a point above the axis or axes of rotation on which the supporting member or lever is pivoted or fulcrumed, will maintain its vertical position when the device is at rest or remains still, or while it is moving with a constant speed, and also will remain approximately in the same vertical position when subjected to acceleration in a horizontal direction at either side and always maintain its balance so that the moment of the force acting about a point O on the fulcrum is practically equal to zero or nil and the forces acting on opposite sides of the fulcrum are equal or balanced.

In Figures 7, 8 and 9 of the drawings a modification is shown somewhat corresponding to Figure 1 and in which corresponding parts are designated by similar reference characters. In this form, there is provided the usual pivot or prism except that two of such pivots or prisms 11 are provided having end fulcrums or knife edges mounted on supporting surfaces or bearings represented in the form of agate cuspins or cushions 12 mounted on a suitable base (not shown) for the instrument which it supports and is adapted to be enclosed in suitable case or cover (not shown) as in the other described forms. The frame consists of two counterweights or inertia discs 17 similar to that shown in Figure 1 but of non-magnetic material and which may be cored out as shown in Figure 8 between the hub 42 and the rim 43 as indicated at 44 to give the proper weight or body. The hubs 42 receive the pivots or prisms 11 and the two counterweights or inertia discs are spaced apart in parallel vertical position between the bearings 12 and connected by a cross suspension member or rod 45 corresponding to the arm 21 and having its ends seated in bores 46 aligned through the counterweights or inertia discs 17 and held in any suitable manner as by set screws 47. The arm or rod 45 may be slotted as at 48 to receive the resilient or elastic pendulous member or arm 49 corresponding to the member 19 and shown in the form of a flat spring strip held by a suitable fastening means 50 such as a screw, through the slot 48. The lower end of the resilient arm or pendulous member 49 carries a permanent magnet 51 of marked polarity having north and south poles indicated at N and S. The ends of the magnet may be diametrically slotted horizontally as indicated at 52 separating the two poles and the magnet may be suspended from the pendulous member 49 in any suitable way. It is shown fixed thereto by a split band or collar 53 encircling the magnet and clamped thereto with its ends 54 brought together and fastened or riveted therethrough against the opposite faces of the pendulous member or resilient arm 49 to operate between the non-magnetic counterweights or inertia discs 17 below the axis or fulcrum and in close proximity to the inner faces of the discs or inertia members so that eddy currents are set up therebetween out of phase or harmony with the vibration period thereof to check or dampen the relative movements between the inertia members and the pendulous member to assist in stabilizing the balanced position thereof to practically maintain its vertical position and the indicating means or member horizontal as previously described and as it is thought will be obvious.

This device provide adequate pendulosity to overcome possible position errors due to bearing friction; enough moment-of-inertia to maintain considerable sluggishness in responding to all applied torques, and enough damping between the elastically supported pendulum weight and the pendulous member assembly, to absorb much of the vibration energy of the pendulum weight, and such a ratio of pendulosity to moment-of-inertia that the natural oscillation period is very long. This combination permits the angular position of the indicating means, horizon bar or pointer attached to the pendulous member to be responsive to a time integral of vector forces representing the dynamic vertical, a result similar to that obtained by a self-erecting gryoscope.

The weighted pendulum or elastically supported pendulum weight forms what may be termed a lazy pendulum which moves outwardly away from vertical to in effect lengthen the same or lever arm produced thereby to reduce the moment of the forces of gravity P acting downwardly and acceleration K acting outwardly, with the resultant vector R, as seen in Figure 3, of the pendulum weight 22 and pendulum comprised by the double-arm lever, supporting member or frame 10 and weight 15, or corresponding weight 22, 31 or 51 in the other forms, tending to disturb the vertical position of the pendulum of pendulous member, governed by the degree of stiffness, flexibility or elasticity of the elastic support or suspension means thereof, and the speed of response to the resultant force of gravity plus acceleration. On the inward movement or swing toward vertical, the effect is reversed in such a manner as will tend to stabilize the position of the indicating means, horizon bar or pointer for effective reading, and the action is comparable to that of a vertical seeking gyro without many of the disadvantages thereof, such as precessing, tumbling, expense and the like well known to those acquainted with the art.

Although the present invention is only described and illustrated in detail for four embodiments thereof, it is to be expressly understood that the same is not limited thereto. Various changes may be made in design and arrangement of the embodiments illustrated, as will now be apparent to those skilled in the art. For a definition of the limits of the invention, reference should be had to the appended claims.

I claim:

1. In a device for indicating a plane having a predetermined attitude, a support having a member for indicating the plane, means mounting said support for rotation about an axis extending through its center of gravity, and a pendulous member suspended from said support at a point above said axis and having its center of mass positioned below said axis.

2. In a device for indicating a plane having a predetermined attitude, a support having a member for indicating the plane, means mounting said support for rotation about an axis extending through its center of gravity, and a pendulous member having its center of mass positioned below said axis and suspended from said support by a resilient arm fixed to said support at a point above said axis.

3. In a device for indicating a plane having a predetermined attitude, a support having a member for indicating the plane, means mounting said support for rotation about a horizontal axis extending through its center of gravity, and a pendulous member suspended from said support at a point above said axis and having its center of mass positioned below said axis in line with said axis and said point.

4. In a device for indicating a plane having a predetermined attitude, a support having a member for indicating the plane, a fulcrum mounting said support for rotation about a horizontal axis extending through its center of gravity, and a pendulous member suspended from said support at a point above said axis and having its center of mass positioned below said axis.

5. In a device for indicating a plane having a predetermined attitude, a support having a member for indicating the plane, means mounting said support for rotation about a pair of mutually perpendicular axes extending through its center of gravity, and a pendulous member suspended from said support at a point above said axes and having its center of mass positioned below said axes.

6. In a device for indicating a plane having a predetermined attitude, a support having a member for indicating the plane, means mounting said support for rotation about a pair of mutually perpendicular axes extending through its center of gravity, and a pendulous member having its center of mass below said axes and suspended from said support by a resilient arm fixed to said support at a point above said axes.

7. In a device for indicating a horizontal plane, a support having a member for indicating the plane, means mounting said support for rotation about a pair of mutually perpendicular horizontal axes extending through its center of gravity, and a pendulous member suspended from said support at a point above said axes and having its center of mass positioned below said axes.

8. In a device for indicating a plane having a predetermined attitude, a support having a member for indicating the plane, means mounting the support for rotation about a pair of mutually perpendicular axes extending through its center of gravity, and a pendulous member suspended from said support by a resilient arm at a point above said axes and having its center of mass positioned below said axes and in line with the intersection of said axes and said point.

9. In a device for indicating a plane having a predetermined attitude, a support having a member for indicating the plane, means mounting said support for rotation about an axis extending through its center of gravity, a pendulous member suspended from said support by a resilient element fixed to said support at a point above said axis and having its center of mass positioned below said axis, and means for damping movement of said pendulous member relative to said support when the device is subjected to acceleration forces.

10. In a device for indicating a plane having a predetermined attitude, a support having a member for indicating the plane and having a pair of spaced inertia elements, means mounting said support for rotation about an axis extending through its center of gravity, and a pendulous member suspended from said support by a resilient element fixed to said support at a point above said axis and having its center of mass positioned below said axis, said pendulous member comprising a magnet closely associated with said inertia elements and positioned therebetween for damping movement of said pendulous member relative to said support when the device is subjected to acceleration forces.

GREGORY V. RYLSKY.

REFERENCES CITED

The following references are of record in the file of this patent:

UNITED STATES PATENTS

| Number | Name | Date |
|---|---|---|
| 313,292 | Doherty | Mar. 3, 1885 |
| 1,297,504 | Skulina | Mar. 18, 1919 |
| 1,542,809 | Alexander | June 25, 1925 |
| 2,031,601 | Hegenberger et al. | Feb. 25, 1936 |
| 2,205,574 | Moross | June 25, 1940 |

FOREIGN PATENTS

| Number | Country | Date |
|---|---|---|
| 17,050 | Great Britain | July 25, 1911 |